United States Patent
Osborne

[19]

[11] Patent Number: 6,116,817
[45] Date of Patent: *Sep. 12, 2000

[54] HYDROCARBON FUEL PIPING SYSTEM WITH A FLEXIBLE INNER PIPE AND AN OUTER PIPE

[75] Inventor: Keith J. Osborne, Glen Ellyn, Ill.

[73] Assignee: PISCES by OPW, Inc., Hamilton, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/085,747

[22] Filed: May 27, 1998

Related U.S. Application Data

[63] Continuation of application No. 08/778,474, Jan. 3, 1997, Pat. No. 5,775,842, which is a continuation of application No. 08/469,652, Jun. 6, 1995, Pat. No. 5,590,981, which is a continuation of application No. 07/286,893, Dec. 20, 1988, Pat. No. 5,553,971.

[51] Int. Cl.[7] .......................................... F16L 1/00

[52] U.S. Cl. .............................. 405/154; 405/52; 405/128

[58] Field of Search ..................................... 405/154, 184, 405/128, 52, 156, 157; 138/103, 104, 114

[56] References Cited

U.S. PATENT DOCUMENTS

| | | |
|---|---|---|
| 216,286 | 6/1879 | Miller . |
| 244,752 | 7/1881 | Hunter et al. . |
| 272,833 | 2/1883 | Goodfellow . |
| 286,938 | 10/1883 | Martin . |
| 291,715 | 1/1884 | Geives et al. . |
| 430,010 | 6/1890 | Flad . |

(List continued on next page.)

FOREIGN PATENT DOCUMENTS

| | | | |
|---|---|---|---|
| 0 207 015 | 6/1986 | European Pat. Off. | ............... 405/154 |
| 207015 | 12/1986 | European Pat. Off. . | |
| 51-003055 | 5/1974 | Japan . | |
| 51-003055 | 1/1976 | Japan . | |
| 57-011800 | 1/1982 | Japan . | |
| 57-146126 | 9/1982 | Japan . | |

(List continued on next page.)

OTHER PUBLICATIONS

United States Court of Appeals for the Federal Circuit, Opinion dated Sep. 15, 1999 in Total Containment, Inc. v. Intelpro Corporation, Plaintiff–Appellant, v. Environ Products, Inc., Defendant–Appellee; 99–1059, 99–1060.

United States District Court for the Eastern District of Pennsylvania, Memorandum and Order dated Sep. 29, 1998 in Environ Products, Inc. v. Intelpro Corporation and Total Containment, Inc., 97–707, Total Containment, Inc. and Intelpro Corporation v. Environ Products, Inc., 97–1020.

(List continued on next page.)

*Primary Examiner*—Dennis L. Taylor
*Attorney, Agent, or Firm*—Dinsmore & Shohl LLP

[57] ABSTRACT

A coaxial piping system connected between an underground pump and an above-ground liquid dispenser is used to provide containment of the pumped liquid from the underground piping system, preventing unintended release into the environment. A pair of coaxial pipes are removably connected to the underground pump at one end and to the dispenser at the other end using quick-disconnect fittings to allow for the replacement of the piping. A primary pipe for conveying gasoline or the like is surrounded by a secondary pipe, which provides containment in the event of leakage from the primary pipe. The piping system can be tested for leaks or replaced from grade without excavating at the installed tank site. A sensor in the annular space between the primary and secondary pipes may be used to detect leakage. A path may be provided for the gravity drainage of such leaks from the secondary pipe into a containment chamber, where the liquid may be detected and removed.

35 Claims, 5 Drawing Sheets

U.S. PATENT DOCUMENTS

| | | |
|---|---|---|
| 470,946 | 3/1892 | Munsie . |
| 648,128 | 4/1900 | Kinniburgh . |
| 745,351 | 12/1903 | Hungerford . |
| 997,434 | 7/1911 | Barnes . |
| 1,188,446 | 6/1916 | Haines . |
| 1,375,363 | 4/1921 | Cary et al. . |
| 1,986,789 | 1/1935 | Bennett . |
| 2,050,968 | 8/1936 | Gottwald et al. . |
| 2,093,114 | 9/1937 | Sommenfeld . |
| 2,113,204 | 4/1938 | Wasser . |
| 2,129,924 | 9/1938 | Galbraith . |
| 2,268,263 | 12/1941 | Newell et al. ............................. 285/5 |
| 2,306,331 | 12/1942 | Elmer . |
| 2,325,565 | 7/1943 | Williams . |
| 2,336,150 | 12/1943 | Horvath . |
| 2,347,912 | 5/1944 | Komives . |
| 2,487,939 | 11/1949 | Norton . |
| 2,507,597 | 5/1950 | Holdridge . |
| 2,546,348 | 3/1951 | Schuman . |
| 2,956,586 | 10/1960 | Zeigler et al. .................. 285/133.1 X |
| 3,221,758 | 12/1965 | Morse . |
| 3,299,417 | 1/1967 | Sibthorpe . |
| 3,379,027 | 4/1968 | Mowell et al. . |
| 3,531,264 | 9/1970 | Greipel . |
| 3,543,377 | 12/1970 | Bremner ............................. 405/154 X |
| 3,559,408 | 2/1971 | Earnhart ............................... 405/52 X |
| 3,672,103 | 6/1972 | Kost . |
| 3,688,801 | 9/1972 | Rohrer . |
| 3,721,270 | 3/1973 | Wittgenstein ........................... 138/104 |
| 3,799,440 | 3/1974 | Goss et al. .......................... 239/321 X |
| 3,841,671 | 10/1974 | Walker ............................... 285/321 X |
| 3,974,862 | 8/1976 | Fuhrmann ............................... 138/37 |
| 3,980,112 | 9/1976 | Basham ............................. 285/133 R |
| 3,995,472 | 12/1976 | Murray ..................................... 73/40 |
| 4,009,739 | 3/1977 | Weatherford ............................ 141/59 |
| 4,010,581 | 3/1977 | Keturi et al. . |
| 4,020,641 | 5/1977 | Takada . |
| 4,062,376 | 12/1977 | McGrath . |
| 4,094,536 | 6/1978 | Cole et al. ........................... 285/353 X |
| 4,110,947 | 9/1978 | Murray et al. ....................... 405/54 X |
| 4,127,286 | 11/1978 | Albertsen ................................ 285/41 |
| 4,132,083 | 1/1979 | McGrath ............................... 405/184 |
| 4,149,568 | 4/1979 | Kuntz et al. ............................ 138/114 |
| 4,159,027 | 6/1979 | Caillet . |
| 4,274,549 | 6/1981 | Germain ................................... 220/86 |
| 4,309,128 | 1/1982 | Williams . |
| 4,315,408 | 2/1982 | Karl . |
| 4,318,835 | 3/1982 | Clarke . |
| 4,411,290 | 10/1983 | Heath . |
| 4,449,853 | 5/1984 | Mennella et al. . |
| 4,457,349 | 7/1984 | Vazin . |
| 4,519,634 | 5/1985 | Hand ................................. 285/353 X |
| 4,561,292 | 12/1985 | Pugnale et al. ........................ 73/49.2 |
| 4,565,351 | 1/1986 | Conti et al. . |
| 4,612,744 | 9/1986 | Shamash . |
| 4,619,555 | 10/1986 | Skinner et al. . |
| 4,639,164 | 1/1987 | Pugnale et al. ........................... 405/54 |
| 4,643,460 | 2/1987 | Lieberg .............................. 285/365 X |
| 4,644,780 | 2/1987 | Jeter .................................... 73/40.5 R |
| 4,667,505 | 5/1987 | Sharp .................................. 73/40.5 R |
| 4,678,370 | 7/1987 | Allen . |
| 4,682,911 | 7/1987 | Moreland ................................ 405/53 |
| 4,685,831 | 8/1987 | Mahoney . |
| 4,702,645 | 10/1987 | Skinner et al. ......................... 405/154 |
| 4,739,648 | 4/1988 | Horner .................................... 73/49.2 |
| 4,770,562 | 9/1988 | Müller et al. .......................... 405/154 |
| 4,778,310 | 10/1988 | Moreland . |
| 4,787,772 | 11/1988 | Wagner ..................................... 405/53 |
| 4,796,669 | 1/1989 | Onge . |
| 4,796,676 | 1/1989 | Hendershot et al. ................ 73/49.2 X |
| 4,805,444 | 2/1989 | Webb ................................. 73/40.5 R |
| 4,874,268 | 10/1989 | Akesaka . |
| 4,886,304 | 12/1989 | Kunsman .............................. 285/104 |
| 4,912,966 | 4/1990 | Sharp ................................. 73/49.2 X |
| 4,932,257 | 6/1990 | Webb ................................. 405/154 X |
| 4,971,477 | 11/1990 | Webb et al. ........................... 405/154 |
| 4,991,626 | 2/1991 | Grantham .......................... 137/614.03 |
| 5,005,613 | 4/1991 | Stanley ..................................... 141/45 |
| 5,042,537 | 8/1991 | Grantham ................................ 141/59 |
| 5,098,221 | 3/1992 | Osborne ................................. 405/52 |
| 5,553,971 | 9/1996 | Osborne ................................. 405/52 |
| 5,567,083 | 10/1996 | Osborne ................................ 405/154 |
| 5,590,981 | 1/1997 | Osborne ................................ 405/154 |

FOREIGN PATENT DOCUMENTS

| | | |
|---|---|---|
| 62-023000 | 2/1987 | Japan . |
| 62-200630 | 12/1987 | Japan . |
| 1374874 | 11/1974 | United Kingdom . |
| 1390280 | 4/1975 | United Kingdom . |
| 2023296A | 12/1979 | United Kingdom . |
| 90/04157 | 4/1990 | WIPO . |

OTHER PUBLICATIONS

United States District Court for the Eastern District of Pennsylvania, Declaration of Keith Osborne in Opposition to Environ's Motion for Partial Summary Judgment of Non–Infringement, executed on Feb. 24, 1998, in Environ Products, Inc. v. Intelpro Corporation and Total Containment, Inc., 97–707, Total Containment, Inc. and Intelpro Corporation v. Environ Products, Inc., 97–1020.

Literature entitled: ke Rohrsysteme und Umwelttechnik, FLEXWELL®—Saugleitung im Tankstellenbau—Oct. 1987 (3 pages) in German.

Piping Sumps, Owens–Corning Fiberglas Corp., Pub. No. 3 PE–13703 and 3–PE–13704, Dec. 1985, various pages.

"Catalog for Concrete Professionals"—4 sheets 7823 Lorsdale Rd., Springfield, VA 22150.

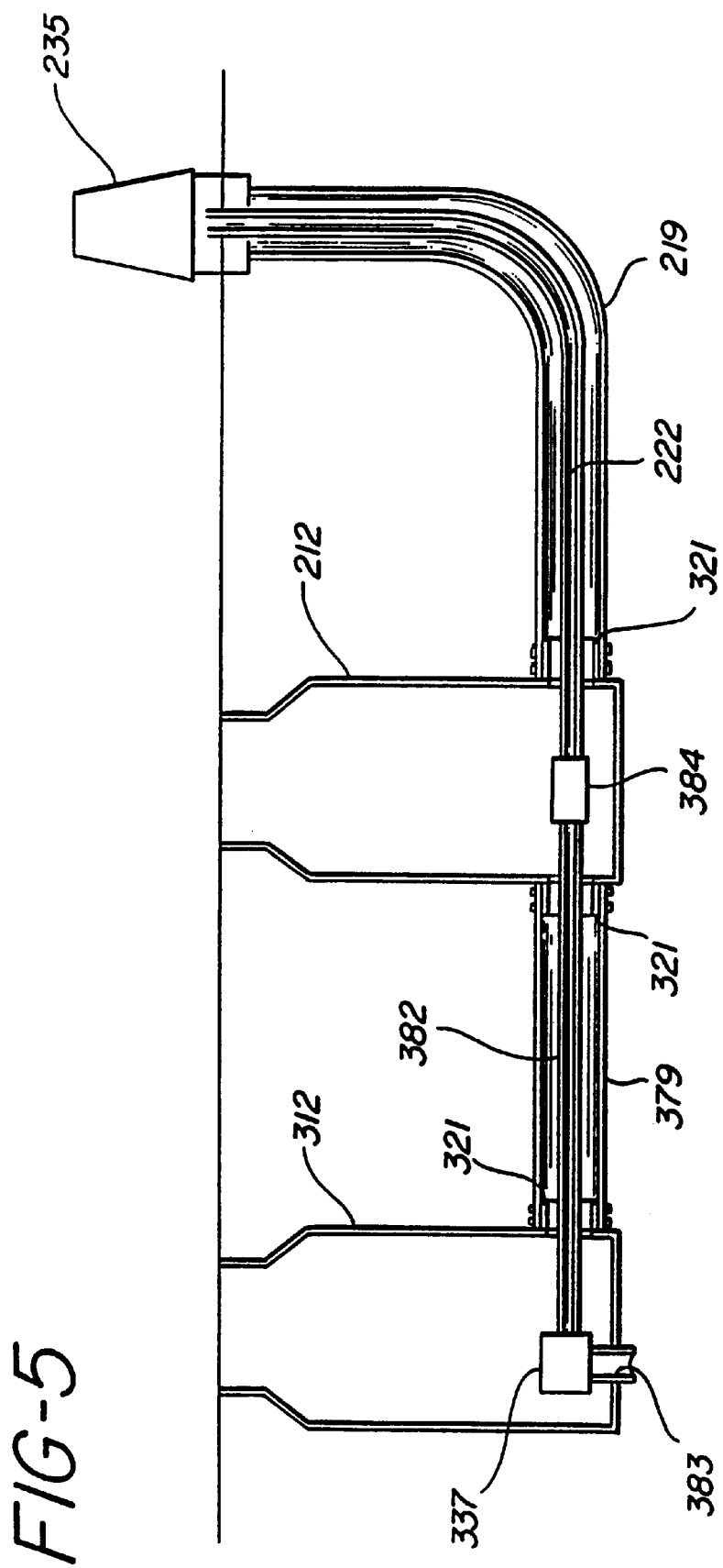

HYDROCARBON FUEL PIPING SYSTEM WITH A FLEXIBLE INNER PIPE AND AN OUTER PIPE

This application is a continuation of application Ser. No. 08/778,474 with filing date of Jan. 3, 1997, now U.S. Pat. No. 5,775,842 which is a continuation of application Ser. No. 08/469,652 with filing date of Jun. 6, 1995 (now issued as U.S. Pat. No. 5,590,981), which is a continuation of application Ser. No. 07/286,893 with filing date of Dec. 20, 1988 (now issued as U.S. Pat. No. 5,553,971).

FIELD OF THE INVENTION

The present invention relates to an improved underground piping system for underground tanks used to store hydrocarbon fuels or the like.

BACKGROUND OF THE INVENTION

Studies by the United States Environmental Protection Agency have found that approximately two-thirds of the leaks in underground storage tanks can be traced to failure of an underground piping system rather than to the tank itself. Specific locations include joints such as unions, elbows and couplings where two straight pieces of pipe are joined together, connections to underground equipment, and corroded steel pipes.

Also, structural failure in piping systems can occur when movements take place in tanks and/or piping systems due to high water tables or settling ground movement. This is particularly true in the case of rigid fiberglass piping systems which are subject to cracking or outright structural failure.

SUMMARY OF THE INVENTION

The present invention provides a piping system for conveying fluid from the outlet port of a pump to the inlet port of a fluid dispenser. The system comprises a primary pipe of flexible material having an inlet end and an outlet end, a secondary pipe of flexible material generally surrounding the primary pipe, a pump coupling removably coupled to the outlet port of the pump, a dispenser coupling removably coupled to the inlet port of the fluid dispenser, and two secondary couplings. A secondary pump coupling removably secures the pump end of the secondary pipe to an outer piping adaptor of the pump coupling. A secondary dispenser coupling removably secures the dispenser end of the secondary pipe to an outer piping adaptor of the dispenser coupling.

The pump coupling comprises an inner pipe in communication with the outlet port of the pump and an outer piping adaptor concentric with the inner pipe. The dispenser coupling comprises an inner pipe in communication with the inlet port of the fluid dispenser and an outer piping adaptor concentric with the inner pipe. The inlet end of the primary pipe is removably secured to the inner pipe of the pump coupling, and the outlet end of the primary pipe is removably secured to the inner pipe of the dispenser coupling.

The secondary pump coupling comprises a first male-threaded coupling adapted to mate with the outer piping adaptor of the pump coupling and a second portion adapted to mate with the pump end of the secondary pipe.

In accordance with the present invention, the annular volume defined by the primary pipe, the secondary pipe, the pump coupling, secondary pump coupling, the dispenser coupling and the secondary dispenser coupling provides containment for the fluid in the event of leakage from the primary pipe.

It is an object of the present invention to prevent or decrease the inadvertent leakage of hazardous liquid, such as hydrocarbon fuel, into the environment from an underground storage tank piping system.

The present invention provides a double-walled flexible piping system especially suitable for use in conjunction with underground tanks used to store hydrocarbon fuels.

An advantage of some embodiments of the present invention is that only two connections are required in the underground piping system.

Another advantage of some embodiments of the present invention is that the piping can be replaced without excavating or breaking ground at the installed tank site.

An additional advantage of some embodiments of the present invention is that piping is readily accessible from grade for structural testing without excavating or breaking ground at the installed tank site.

It is a feature of the present invention that in the event of a leak of the primary pipe, the leak is virtually totally contained within the space between the primary and secondary pipe or in a containment chamber and is not discharged to the surroundings.

An additional feature of a preferred embodiment of the present invention is that a sensor placed between the walls of the two concentric pipes provides a method of detecting any release from the primary pipe. For example, a release from the primary pipe may cause an alarm to sound.

An additional feature of a preferred embodiment is that any leakage from the primary pipe into the space between the primary and secondary pipes can be drained into a containment chamber, where it can be removed without contaminating the environment.

An additional feature of an alternative embodiment is that any leakage into the space between the primary and secondary pipe can be removed by suction at the dispenser connection above ground, so that it can be removed without contaminating the environment.

BRIEF DESCRIPTION OF THE DRAWINGS

FIG. 5 is a schematic elevational cross-section of another embodiment of a piping system according to the present invention, including a flexible piping run/manifold connection to other underground storage tank systems.

DETAILED DESCRIPTION

Figure 1:
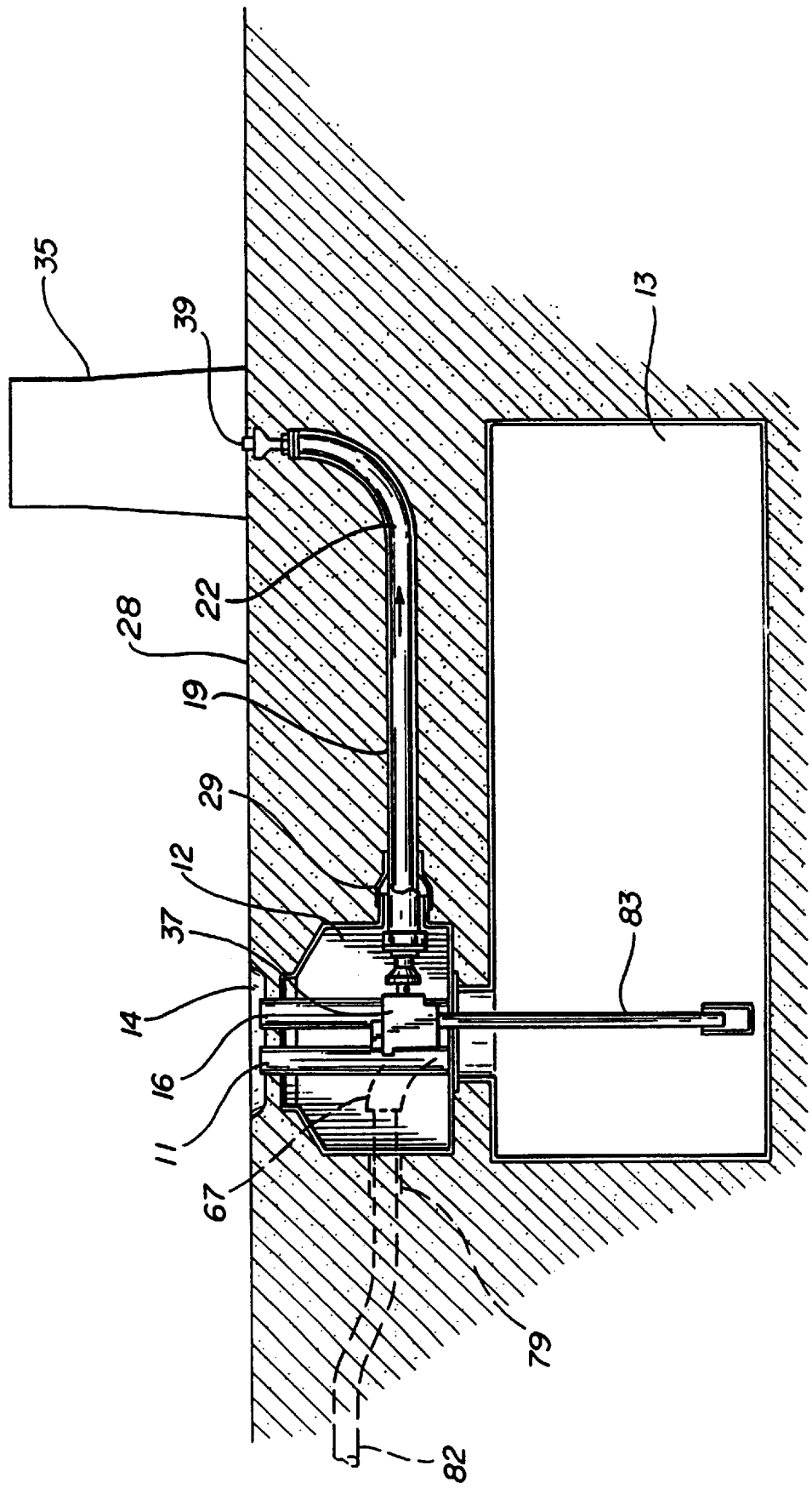
FIG. 1 is an elevational cross-section of an installed underground fuel storage tank provided with a piping system in accordance with the present invention.

FIG. 1 shows an underground fuel tank 13 with a single manway 14 at grade level 28, equipped with a containment chamber 12. The containment chamber 12 provides access to a pump 37 and underground piping 19, 22. The underground tank 13 is filled with fuel by opening the manway 14 and transferring fuel to tank 13 through fill pipe 16.

A pump 37 is provided to pump fuel from the underground tank 13 through a primary pipe 22 to a fuel dispenser coupling 39 providing input to a fuel dispenser 35. The fuel dispenser 35 may be a conventional service station gas pump. In accordance with the present invention, a secondary pipe 19 jackets the primary pipe 22 and provides containment for any fuel that might leak out of primary pipe 22.

To enter the containment chamber 12, one removes the manway cover (not shown), exposing the vapor recovery pipe 11 and the fill pipe 16. The vapor recovery pipe 11 and the fill pipe 16 can then be removed from grade level 28.

Figure 2:
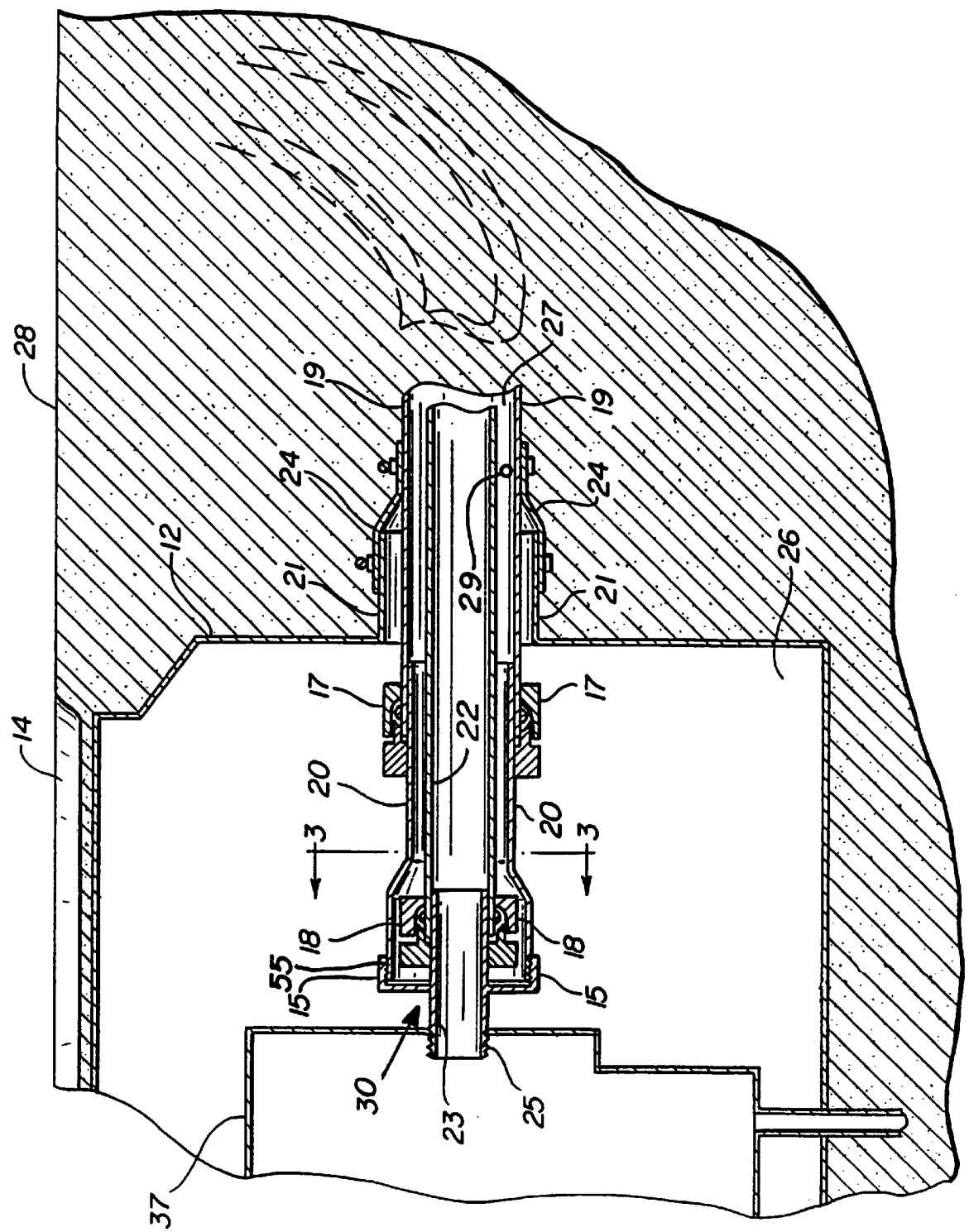
FIG. 2 is an elevational cross-section of a portion of the piping system of FIG. 1 showing in greater detail the connection of the flexible pipe with the pump body.
Figure 3:
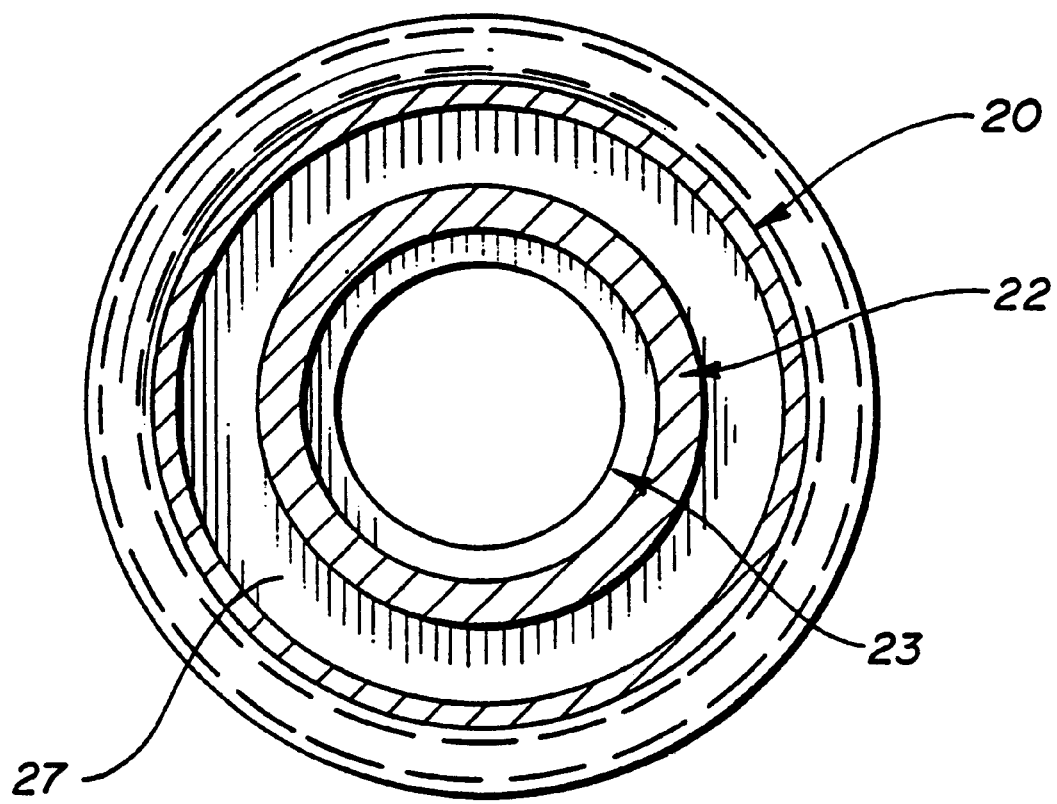
FIG. 3 is a cross-section taken along the line 3—3 of FIG. 2.

As shown in FIG. 2, the compression fittings 17, 18 for the secondary pipe 19 and the primary pipe 22 are thereby accessible from the containment chamber 12. The compression fitting 17 for the secondary pipe 19 is disconnected. The male-threaded coupling 20 is next unscrewed from the female-tapped outer piping adaptor 15, and the male-threaded coupling 20 is forced away from the pump 37 and outer piping adaptor 15, thereby exposing the compression fitting 18 connecting the primary pipe 22 with an inner pipe 23 of the piping adaptor 30. The compression fitting 18 can now be disconnected, thus disconnecting the primary pipe 22 and the secondary pipe 19 from the piping adaptor 30 and the pump 37. The other ends of the primary pipe 22 and secondary pipe 19 are similarly disconnected from the dispenser coupling 39 at or about grade level 28.

The primary pipe 22 can now be "fished" or pulled up and out from the outer secondary pipe 19 from grade level 28. The primary pipe 22 and the secondary pipe 19 are accessible at both ends—below grade at the interface with the containment chamber 12, and at or about grade level 28 at the fuel dispenser coupling 39. Since the pipes 19, 22 are flexible, the pipe may be shipped to the field site where the tank is installed and cut at the job site to the desired length.

The piping adaptor 30 is a forged or cast custom fitting comprising two-inch outside diameter inner pipe 23 connected to an outlet of the pump 37, below ground. The dispenser coupling 39 has a corresponding fitting connected to the dispenser inlet port. The flexible primary pipe 22, having a two-inch inner diameter in this preferred embodiment, fits over the inner pipe 23. The compression fitting 18 clamps and firmly secures the primary pipe 22 to the inner pipe 23. The length of the inner pipe 23 of the piping adaptor 30 is typically two pipe diameters. The compression fitting 18 may be substituted with a common hose clamp, strap or other fitting.

The male-threaded coupling 20 is a 4-inch outside diameter steel pipe adaptor with external threads. It screws at its threaded end 55 into the outer piping adaptor 15. In this preferred embodiment, the flexible secondary pipe 19 is 4-inch inside diameter hose piping. It slides over the free end of the coupling 20. A compression fitting 17 clamps and firmly secures the secondary pipe 19 to the male coupling 20.

After installation of the flexible piping system, the outside secondary pipe 19 is secured to be relatively stationary as it is buried in the ground. The secondary pipe 19 serves as a guide for the primary pipe 22 which slides into or is retractable from it.

The inner pipe 23 has a male thread 25 that screws into the outlet port of the pump 37. (In some cases where the pump has a standard male connection, a standard pipe coupling may be necessary to connect the inner pipe 23.) Once the inner pipe 23 is screwed into the outlet port of the pump 37, the piping adaptor 30 is fixed and is generally not removed.

A boot 24 is used to seal the entry of the secondary pipe 19, where it enters the containment chamber 12 by being sealed to a sleeve 21 which is an integral part of the containment chamber 12.

If the primary pipe 22 leaks, the leakage is contained in the annular space 27 between the primary pipe 22 and secondary pipe 19, and will not escape into and flood the containment chamber 12. If a leak arises at the juncture of the inner pipe 23 and pump 37, or at either of the two compression fittings 17 or 18, the presence of boot 24 ensures that the leak is contained in the piping containment chamber 12 at interior space 26 and does not overflow into the surrounding soil. The boot 24 also prevents leakage from the fill pipe 16 from escaping from the containment chamber 12 into the soil.

The annular space 27 between the coaxial primary pipe 22 and secondary pipe 19 can be tested for leakage in the primary pipe 22 by locating one or more sensors 29 in the annular space 27 between the pipes 22 and 19.

Installation Method

An installation method will now be described with reference to another preferred embodiment of the invention shown in FIG. 4.

First, a flexible secondary pipe 119 is installed below the ground, and then a flexible inner primary pipe 22 is inserted from grade level 128 into the previously installed outer pipe 119. One end of the two concentric pipes 119, 122 is mechanically connected inside the containment chamber 112, which is made accessible by removal of manway cover (not shown). The above-ground ends of the two concentric pipes 119, 122 are mechanically connected inside a containment pan 138 located below a fuel dispenser 135.

Accordingly there are only two locations where there are mechanical fittings in the piping run—the connection at the containment chamber 112, and the connection at the containment pan 138. In accordance with the present invention, the only mechanical piping connections at which the primary pipe 122 is likely to leak are located in chambers 112, 138. This must be compared with conventional piping systems wherein many underground connections are employed, and which are buried and inaccessible. To reach these connections it is necessary to excavate much of the piping system in order to find a leak. Furthermore, in the event of a leak at the connection 18 between the primary pipe 122 and the pump 137 in containment chamber 112, manway 114 may be opened and primary pipe 22 may be replaced with a new pipe underground without disturbing the concrete slab (not shown) at grade level 128. So the underground piping is replaceable from grade 128 and without requiring excavation.

In FIG. 2, containment of the liquid, in the event of a leak in the primary pipe 22, will be held in the secondary or containment pipe 19, which serves a containment function. FIG. 4 schematically illustrates an alternate embodiment of a piping system between a pump 137 and a dispenser 135 of an underground storage tank—dispenser piping system. In the embodiment of FIG. 4, a leak from the primary pipe 122 will flow into the secondary containment pipe 119, which provides containment of the leak. From the secondary pipe 119, the contained leak will drain by gravity to interior space 126 in the leak containment chamber 112. The coupling 199 securing the primary pipe 122 at the base of the dispenser 135 is connected to the bottom of the shear valve 139. This coupling 199 is substantially similar to the coupling 198 at the other end of the double piping system in the containment chamber 112. The secondary pipe 119 is connected directly to sleeves that protrude from the containment pan 138 at one end and the containment chamber 112 at the other end. The method of connection may be stainless steel straps or bands 157, applied in the field with a strap tightening and clamping tool. Alternatively, a compression fitting may be used. Access to the containment chamber 112 is provided through the manway 114.

Figure 4:
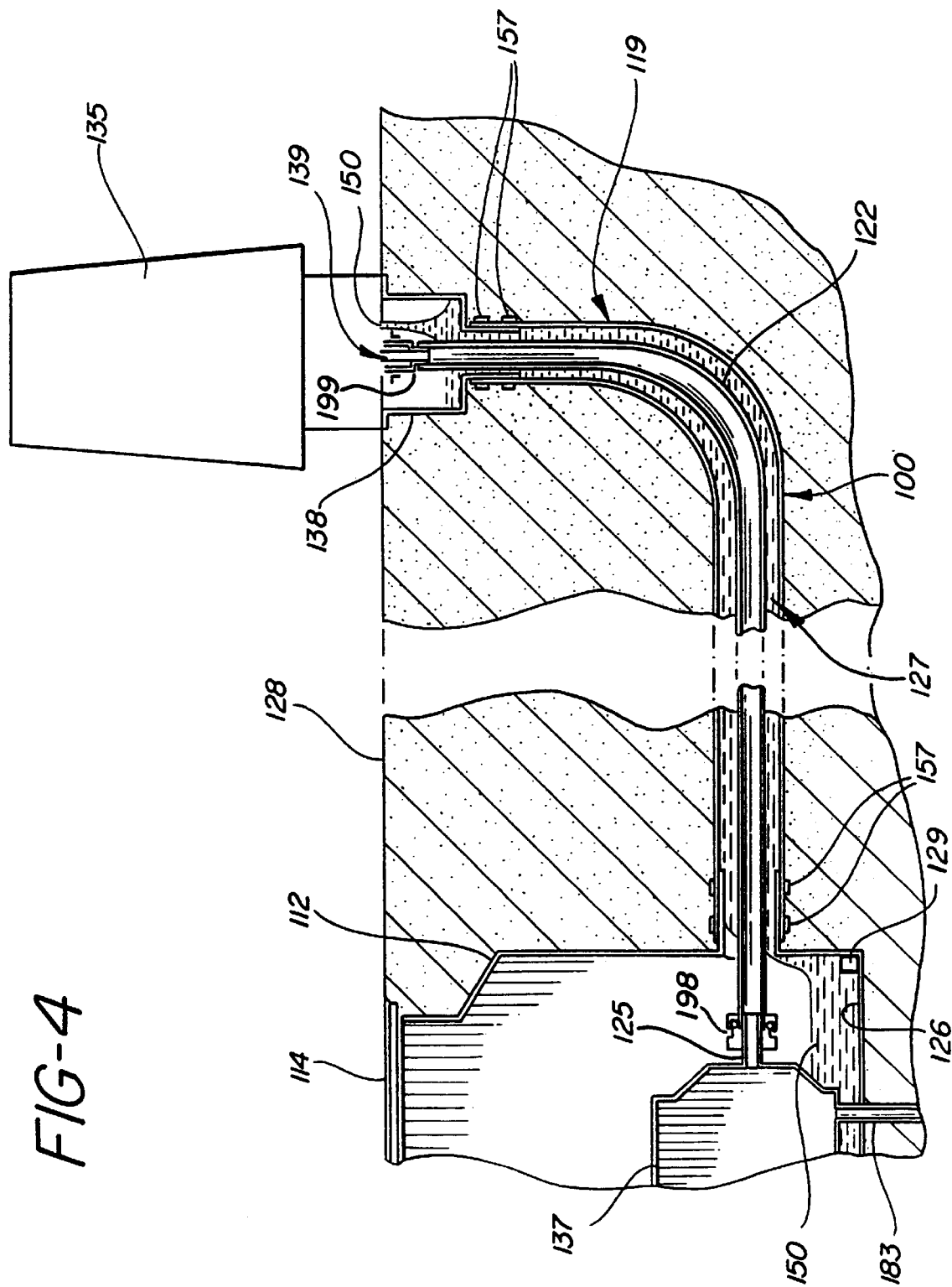
FIG. 4 is an elevational cross-section of another embodiment of a piping system according to the present invention.

In either of the embodiments illustrated in FIGS. 2 and 4, monitoring systems are preferably installed where leaks collect so that necessary repairs can be performed without a "release" to the environment. In both the described embodiments, the primary pipe 22 or 122 can be replaced from above grounds.

The material of the primary pipe 22 or 122, and the secondary pipe 19 or 119 in the two depicted embodiments is similar to the conventional 'hose' construction, i.e. reinforced rubber or plastic material suitable for gasoline service.

A gasoline delivery hose—while having a short life-span above ground—will exhibit a substantially longer life when used below ground in darkness (i.e. out of bright sunlight) and in a stationary condition, as illustrated in FIGS. 1, 2 and 4. In such use, there will be no degradation of pipe material due to exposure to sunlight, and no deterioration of pipe material due to wear and tear which accompanies the frequent movement of the pipes which sometimes occurs in above-ground applications. Under such circumstances, the life expectancy of the underground piping system shown in FIGS. 1, 2 and 4 will exceed 10 years instead of the approximately 4 year average life expectancy of conventional above-ground delivery hose applications.

Furthermore, in the event of very long runs of pipe between the fuel storage tank and the fuel dispenser, a repeater containment chamber 212 may be placed in the pipe run. The repeater containment chamber 212, primary 222 and secondary 219 pipes, a piping containment chamber 312 and a fuel dispenser 235 are schematically shown in FIG. 5. The use of repeater containment chambers will be necessary in cases where the length of the primary and secondary piping delivered to the jobsite is less than the distance between the piping containment chamber 312 and the fuel dispenser 235, or if multiple fuel storage tanks are utilized and interconnectors in the piping become necessary.

It is apparent that the objects of the invention are fulfilled by the foregoing disclosure. It is to be understood, however, that many modifications may be made to the above-described embodiments, some of which have been mentioned above. These and other modifications are to be deemed within the spirit and scope of the above-disclosed invention, which should be interpreted with reference to the following claims.

Having thus described the invention, what I desire to protect by Letters Patent and hereby claim is:

1. A piping system for carrying hydrocarbon fuel from a fuel source to a fuel destination, the system comprising:
    a flexible inner pipe made of a material suitable for carrying hydrocarbon fuel and capable of following a curvilinear path;
    a plurality of connectors attached in cooperation with the inner pipe to provide fluid communication between the fuel source and the fuel destination;
    an outer pipe having a first end and a second end, the outer pipe generally surrounding at least a portion of the inner pipe; and
    a plurality of fluid-tight access chambers, each of the connectors being accessible from a respective one of the chambers, and each end of the outer pipe being adjacent to and attached in a generally fluid-tight manner with a respective one of the chambers.

2. The piping system according to claim 1, further comprising a sleeve adapted to be connected to the outer pipe and the chamber.

3. The piping system according to claim 2, further comprising straps connecting the outer pipe to the sleeve of the respective chamber.

4. The piping system according to claim 1, wherein the inner pipe comprises plastic suitable for gasoline service.

5. The piping system according to claim 1, wherein the outer pipe is flexible.

6. The piping system according to claim 1, wherein at least a portion of the outer pipe is spaced away from the inner pipe, thereby defining a space between the inner pipe and the outer pipe.

7. The piping system according to claim 1, further comprising a sensor located at a location suitable to detect any release of fuel from the inner pipe.

8. The piping system according to claim 1, wherein at least one of the chambers is at least partially underground and
    the fuel source is located in one of the underground chambers.

9. The piping system according to claim 1, further comprising a fuel dispenser assembly with the fuel destination being located below the dispenser assembly.

10. The piping system according to claim 1, wherein the inner pipe comprises a coaxial primary pipe.

11. The piping system according to claim 1, wherein at least portions of the inner pipe can be retrofitted through at least one of the chambers and without excavating or breaking ground.

12. The piping system according to claim 1, wherein the inner pipe is removable from the outer pipe.

13. The piping system according to claim 1, wherein the inner pipe comprises a plurality of portions, each of the portions being in fluid communication with a respective one of the other portions through at least one of the connectors, and wherein each of the connectors is respectively located within a respective one of the chambers.

14. The piping system according to claim 1, wherein the outer pipe comprises at least two sections, each end of each section of the outer pipe being adjacent to and attached in a generally fluid-tight manner with a respective one of the chambers.

15. The piping system according to claim 8, wherein the fuel source is an underground pump.

16. The piping system according to claim 1, wherein the outer pipe and the chambers are located and constructed so that the portion of any fuel which leaks from the inner pipe will drain by gravity from the outer pipe into at least one of the chambers.

17. The piping system according to claim 1, wherein the inner pipe comprises reinforced rubber suitable for gasoline service.

18. A piping system for carrying hydrocarbon fuel from an underground pump to an above-ground fuel dispenser, the system comprising:
    a flexible inner pipe made of a material suitable for carrying hydrocarbon fuel and capable of following a curvilinear path;
    a plurality of underground connectors attached in cooperation with the inner pipe to provide fluid communication between the underground pump and the fuel dispenser;
    an outer pipe having a first end and a second end, the outer pipe generally surrounding at least a portion of the inner pipe; and
    a plurality of fluid-tight access chambers, each of the underground connectors being accessible from a respective one of the chambers, and each end of the outer pipe being adjacent to and attached in a generally fluid-tight manner with a respective one of the chambers.

19. The piping system according to claim 18, wherein the inner pipe comprises a plurality of portions, each of the portions being in fluid communication with a respective one of the other portions through at least one of the connectors, and wherein each of the connectors is respectively located within a respective one of the chambers.

20. The piping system according to claim 18, wherein the outer pipe is flexible.

21. The piping system according to claim 18, wherein the inner pipe is removable.

22. The piping system according to claim 18, wherein the outer pipe comprises at least two sections, each end of each section of the outer pipe being adjacent to and attached in a generally fluid-tight manner with a respective one of the chambers.

23. A secondarily-contained piping system for use at a hydrocarbon fueling station, comprising:

an above-ground fuel dispenser;

an underground pump;

a flexible inner pipe having a plurality of portions, made of a material suitable for carrying hydrocarbon fuel, and capable of following a curvilinear path, each of the portions being in fluid communication with a respective one of the other portions through at least one connector, and the flexible inner pipe being in fluid communication with the pump and the fuel dispenser;

a plurality of fluid-tight access chambers each comprising a side wall, the inner pipe passing through the side wall of the chambers, and each of the at least one connectors being disposed within a respective one of the chambers; and an outer containment pipe generally surrounding at least a portion of the inner pipe and in generally fluid-tight communication with the chambers.

24. The secondarily-contained piping system according to claim 23, wherein the outer containment pipe is flexible.

25. The secondarily-contained piping system according to claim 23, wherein the flexible inner pipe is removable.

26. The piping system according to claim 1, wherein the plurality of fluid-tight access chambers comprises at least three fluid-tight access chambers.

27. The piping system according to claim 1, wherein at least one of the connectors comprises a coupling.

28. The piping system according to claim 27, wherein the at least one of the connectors further comprises an associated fitting.

29. The piping system according to claim 18, wherein the plurality of fluid-tight access chambers comprises at least three fluid-tight access chambers.

30. The piping system according to claim 18, wherein at least one of the connectors comprises a coupling.

31. The piping system according to claim 30, wherein the at least one of the connectors further comprises an associated fitting.

32. The piping system according to claim 1, wherein the fuel destination comprises a shear valve.

33. The piping system according to claim 1, wherein the outer pipe and the chambers are located and constructed so that at least a portion of any fuel which leaks from the inner pipe will drain from the outer pipe into at least one of the chambers and will not be discharged to the surroundings.

34. The piping system according to claim 18, wherein the outer pipe and the chambers are located and constructed so that at least a portion of any fuel which leaks from the inner pipe will drain from the outer pipe into at least one of the chambers and will not be discharged to the surroundings.

35. The piping system according to claim 23, wherein the outer pipe and the chambers are located and constructed so that at least a portion of any fuel which leaks from the inner pipe will drain from the outer pipe into at least one of the chambers and will not be discharged to the surroundings.

* * * * *